US012595443B2

(12) United States Patent
Callahan

(10) Patent No.: US 12,595,443 B2
(45) Date of Patent: Apr. 7, 2026

(54) ORGANIC ACID CLEANING, DISINFECTING AND SANITIZING WET WIPE COMPOSITION

(71) Applicant: Rockline Industries, Inc., Sheboygan, WI (US)

(72) Inventor: Molly Ryan Callahan, Sheboygan, WI (US)

(73) Assignee: Rockline Industries, Inc., Sheboygan, WI (US)

( * ) Notice: Subject to any disclaimer, the term of this patent is extended or adjusted under 35 U.S.C. 154(b) by 748 days.

(21) Appl. No.: 17/548,736

(22) Filed: Dec. 13, 2021

(65) Prior Publication Data

US 2023/0183615 A1 Jun. 15, 2023

(51) Int. Cl.

| | |
|---|---|
| ***C11D 1/72*** | (2006.01) |
| ***B08B 3/04*** | (2006.01) |
| ***C11D 1/825*** | (2006.01) |
| ***C11D 3/00*** | (2006.01) |
| ***C11D 3/20*** | (2006.01) |
| ***C11D 3/22*** | (2006.01) |
| ***C11D 3/48*** | (2006.01) |
| ***C11D 3/50*** | (2006.01) |
| *C11D 1/66* | (2006.01) |

(52) U.S. Cl.

CPC .............. *C11D 3/48* (2013.01); *C11D 1/8255* (2013.01); *C11D 3/0026* (2013.01); *C11D 3/2082* (2013.01); *C11D 3/2086* (2013.01); *C11D 3/50* (2013.01); *C11D 1/66* (2013.01); *C11D 1/662* (2013.01); *C11D 2111/14* (2024.01)

(58) Field of Classification Search

CPC ........... C11D 1/662; C11D 1/72; C11D 1/825; C11D 3/2075; C11D 3/2086; C11D 3/22; C11D 3/48; B08B 3/04

See application file for complete search history.

(56) References Cited

U.S. PATENT DOCUMENTS

| | | | | |
|---|---|---|---|---|
| 2010/0240752 | A1* | 9/2010 | Dreilinger | C11D 3/2086 514/557 |
| 2012/0122757 | A1* | 5/2012 | Gaudreault | C11D 3/2068 510/488 |
| 2019/0330568 | A1* | 10/2019 | Ceulemans | C11D 1/83 |

FOREIGN PATENT DOCUMENTS

| | | | | |
|---|---|---|---|---|
| WO | 2019143882 A1 | | 7/2019 | |
| WO | 2022074514 A1 | | 4/2022 | |
| WO | WO 2022/074514 | * | 4/2022 | A23L 3/34 |
| WO | 2022223573 A1 | | 10/2022 | |
| WO | 2022243012 A1 | | 11/2022 | |
| WO | WO 2022/243012 | * | 11/2022 | A01N 63/20 |

OTHER PUBLICATIONS

Search Report dated Sep. 16, 2022 in European App. No. 22163957.8.

* cited by examiner

*Primary Examiner* — Brian P Mruk

(74) *Attorney, Agent, or Firm* — Boyle Fredrickson S.C.

(57) ABSTRACT

A disinfecting, sanitizing and cleaning composition is a formulation that is safe for use on food contact surfaces without the need for any post-application water rinse. In one exemplary embodiment, the cleaning and disinfecting composition eliminates the need for the post-application water rinse by using only components that are considered Food Safe by the EPA. In another exemplary embodiment, the cleaning and disinfecting composition the includes citric acid, but without any anionic surfactants in the cleaning and disinfecting composition. In still another exemplary embodiment of the disclosure, the cleaning and disinfecting composition includes a second organic acid and one or more nonionic surfactants as components along with citric acid to provide unexpected and beneficial antimicrobial properties to the cleaning and disinfecting composition.

9 Claims, No Drawings

ORGANIC ACID CLEANING, DISINFECTING AND SANITIZING WET WIPE COMPOSITION

FIELD OF THE INVENTION

The present invention relates to a cleaning composition for use on hard surfaces, particularly hard surfaces that are food contact surfaces.

BACKGROUND OF THE INVENTION

An increasing number of consumers are seeking cleaning products that not only are more natural or sustainable, but which also exhibit better overall safety of use. Consumers prefer products that can be readily used around children and pets in convenient forms such as pre-loaded disposable wipes or ready to use sprays, but these safer and more sustainable products still are expected to deliver performance on many attributes, such as cleaning and reduction of germs, at parity to traditional products.

In particular, wet wipes, or disinfecting and/or cleaning wipes, have gained wide public acceptance in the area of hard surface cleaning. These hard surface cleaning wipes can include emulsions (i.e. water-in-oil or oil-in-water), waxes and polish to clean furniture and/or other metal, plastic and/or wood surfaces. The hard surfaces cleaning wet wipes can further include soaps and/or detergents to clean, countertops, floors, appliances, and/or the like. Short chain alcohols and various other biocides can also be included on cleaning wipes to disinfect or sanitize a variety of surfaces.

Traditional hard surface wet wipes used to clean and disinfect hard surfaces include components that provide the disinfecting and sanitizing effect required to enable the disinfecting and cleaning composition and the wet wipe containing that composition to be labeled as a hard surface cleaning, disinfecting and sanitizing cleaning wipe. However, due to known health hazards these components require that the surface on which the wet wipe containing the disinfecting and cleaning composition is utilized be rinsed with potable water after the application of the disinfecting composition via the wet wipe. On many occasions the rinse with potable water is not performed, such that these cleaning, disinfecting and sanitizing components ultimately and readily come into contact with food placed on the cleaned surface, creating a health hazard.

In order to avoid the water rinse requirement, certain sanitizing, disinfecting and cleaning compositions for use in wet wipes for food contact surfaces are formulated with a quaternary ammonium surfactant ("quat") active ingredient, such as a quaternary ammonium chloride, which is qualified for Food Use by the Environmental Protection Agency (EPA). The quat enables the wet wipe containing the quat to be used on a food contact surface, such as a kitchen countertop, without the need for a post-application water rinse. However, the limits on the amount of the quat that can be employed in the sanitizing, disinfecting and cleaning composition are very low, i.e., less than or equal to 400 ppm, making the composition difficult to manufacture and also limiting the effectiveness of the compositions.

Further, while being approved for Food Use, the quat active ingredient has a limited efficacy against particular microorganisms commonly found on food contact surfaces.

Further, with the amounts of the quat active ingredient in the cleaning, disinfecting and sanitizing composition, e.g., 0.30%-0.38% w/w, the application of the wet wipe with the disinfecting and sanitizing composition leaves behind an undesirable and unwanted residue, streaking and matte finish. Also, regardless of the benefits provided by the quat active ingredient, the quat is not an environmentally friendly component and is actively being phased out of numerous cleaning compositions for this reason.

Finally, and in addition to the issues presented by the presence of the quats, the high alcohol content (20%-60% w/w) utilized in formulating these disinfecting compositions makes these compositions highly flammable, rendering these disinfecting compositions problematic from at least a storage and use point of view.

As a substitute for the quats, an alternative active ingredient that has been utilized in hard surface disinfecting and sanitizing wipes is citric acid. While citric acid is environmentally friendly, in order reach the required levels of microbial efficacy for a hard surface cleaning wipe, the citric acid must be combined with one or more anionic surfactants. While effective in their antimicrobial capacity, these anionic surfactants, such as sulfates or sulfonates, are not environmentally friendly components, as are undesirable for use in sanitizing, disinfecting and cleaning compositions.

In view of the present state of the art of cleaning, disinfecting and sanitizing compositions for wet wipes, there is a need for an improved disinfecting and cleaning composition for use in a wet wipe that can be used to clean, disinfect, and sanitize food contact surfaces without the deficiencies presented above.

SUMMARY OF THE INVENTION

In light of the foregoing, the invention is directed to an improved cleaning, disinfecting and sanitizing composition for wet wipes and other cleaning modalities, e.g., liquids, sprays, gels and dilutable concentrated compositions. The cleaning, disinfecting and sanitizing composition is a formulation that is safe for use on food contact surfaces without the need for any post-application water rinse. In one exemplary embodiment, the cleaning, disinfecting and sanitizing composition eliminates the need for the post-application water rinse by using only components that are considered Food Safe by the EPA. In another exemplary embodiment, the cleaning, disinfecting and sanitizing composition the includes citric acid, but without any anionic surfactants in the cleaning, disinfecting and sanitizing composition. In still another exemplary embodiment of the disclosure, the cleaning, disinfecting and sanitizing composition includes a second organic acid and one or more nonionic surfactants as components along with citric acid to provide unexpected and beneficial antimicrobial properties to the cleaning, disinfecting and sanitizing composition.

According to another exemplary embodiment of the invention, other components are optionally present in the cleaning, disinfecting and sanitizing composition, such as, for example, water, surfactants, emollients, preservatives, solubilizers, pH buffers, anti-foaming agents, solvents, conditioning agents, humectants, fragrances, botanical extracts, oils, silicones and the like, and combinations of the same. All components of the formulation are blended together to form a cleaning, disinfecting and sanitizing composition, solution or emulsion that can be impregnated within or otherwise applied to a nonwoven, cloth or paper substrate, or combinations of the same to form a usable wet wipe for storage and consumer use.

According to one aspect of an exemplary embodiment of the invention, a method of cleaning a surface includes the steps of providing a cleaning, disinfecting and sanitizing composition formed entirely of food safe component and applying the cleaning, disinfecting and sanitizing composition to surface without the need for any post-application water rinse for the surface.

According to still another aspect of an exemplary embodiment off the invention, a cleaning wipe includes a substrate and a cleaning, disinfecting and sanitizing composition loaded onto the substrate, the cleaning, disinfecting and sanitizing composition formed of a second organic acid and one or more nonionic surfactants as components along with citric acid.

According to still a further aspect of an exemplary embodiment of the invention, a cleaning, disinfecting and sanitizing composition includes a cleaning, disinfecting and sanitizing having a first organic acid and a second organic acid, without any anionic surfactants in the cleaning, disinfecting and sanitizing composition.

Without limitation then, in other exemplary embodiments this invention is also a wet wipe, or cleaning wipe, comprising a cleaning, disinfecting and sanitizing composition or formulation, where the wipe comprises at least one layer of a nonwoven material, and a cleaning, disinfecting and sanitizing composition comprising citric acid and no anionic surfactants, along with a second organic acid. In one aspect, other components are optionally present in the cleaning, disinfecting and sanitizing composition, such as, for example, water, surfactants, emollients, preservatives, solubilizers, pH buffers, anti-foaming agents, solvents, skin conditioning agents, humectants, fragrances, botanical extracts, oils, silicones and the like, and combinations of the same.

Other features, benefits and advantages of the present invention will be apparent from this summary and its descriptions of certain embodiments of such formulations and compositions, and will be readily apparent to those skilled in the art having knowledge of the synthetic techniques described therewith. Such features, benefits and advantages will be apparent from the above as taken into conjunction with the accompanying examples, data, and all reasonable inferences to be drawn therefrom.

DETAILED DESCRIPTION OF CERTAIN EMBODIMENTS

The invention relates to a formulation for a cleaning, disinfecting and sanitizing composition (or simply a "cleaning composition") comprising citric acid and a second organic acid, without any anionic surfactants. The cleaning, disinfecting and sanitizing composition of the invention can be used, for example, with hard surface cleaning wipes, such as for use on food contact surfaces, antibacterial wipes, and hand-cleaning wipes. As used herein, a "wipe" is a type of article suitable for cleansing or disinfecting or for applying a compound and/or removing materials and compounds from hard surfaces, such as food contact surfaces and/or those disclosed in U.S. Pat. Nos. 7,101,612; 6,814,974; and 6,444,214, each of which is hereby expressly incorporated by reference in its entirety for all purposes.

According to one exemplary embodiment, the cleaning, disinfecting and sanitizing composition includes a first organic acid, which can be a carboxylic acid, including lactic acid, acetic acid, formic acid, oxalic acid, malic acid, tartaric acid or citric acid, which has the following chemical structure:

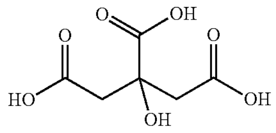 [SMILES: O=C(O)CC(O)(CC(=O)O)C(=O)O]

In addition to the first organic acid, the cleaning, disinfecting and sanitizing composition also comprises a second organic acid, which can be a carboxylic acid, including acetic acid, formic acid, oxalic acid, malic acid, tartaric acid, citric acid, or lactic acid, which has the following chemical structure:

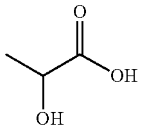

In addition to the first organic acid and the second organic acid, the cleaning, disinfecting and sanitizing composition includes at least one nonionic surfactant. In certain exemplary embodiments, the nonionic surfactant is an alkyl polyglycoside, which can be an alkyl glucoside which has the following general structure

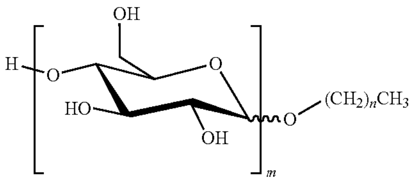

wherein m is between 1 and 10, and n is between 6 and 20. Exemplary alkyl polyglucosides include decyl glucoside, lauryl glucoside and octyl glucoside, with one particular exemplary alkyl polyglucoside being a $C_8$-$C_{10}$ alkyl polyglucoside sold by BASF under the tradename GLUCOPON® 225 DK.

In another exemplary embodiment, the nonionic surfactant can be an alcohol ethoxylate, such as a fatty alcohol ethoxylate, which has the following general chemical structure: $R(OC_2H_4)_nOH$, where R is $C_8$-$C_{18}$, and n is between 1 and 40. Examples of particular fatty alcohol ethoxylates include octaethylene glycol monodecyl ether and pentaethylene glycol monodecyl ether, with one particular exemplary fatty alcohol ethoxlylate being ECO NATRASENSE WS sold by Croda. In other exemplary embodiments, the nonionic surfactant can be a combination of nonionic surfactants, such as a combination of one or more alkyl polyglucosides with one or more fatty alcohol ethoxylates, as described previously.

It is to be understood that the formulation for the cleaning, disinfecting and sanitizing composition can optionally include various other components or adjuncts. The first organic acid, second organic acid, and various other components are blended together to form a wet wipe solution or emulsion that can be applied to a substrate to form a usable wet wipe that is sufficiently formulated for storage and consumer use.

In an exemplary embodiment of the cleaning, disinfecting and sanitizing composition, the amount of the first organic acid in the final cleaning, disinfecting and sanitizing composition is from 1.0% to 2.50% by weight, and more preferably 1.50% to 2.0% by weight of the cleaning, disinfecting and sanitizing, disinfecting and sanitizing composition. The amount of second organic acid in the final cleaning, disinfecting and sanitizing composition is from 1.0% to 5.0% by weight, and more preferably 1.50% to 4.0% by weight of the cleaning, disinfecting and sanitizing composition. The amount of the nonionic surfactant in the final cleaning, disinfecting and sanitizing composition is from 0.05% to 1.50% be weight, and more specifically 0.10% to 1.0% by weight of the cleaning, disinfecting and sanitizing composition. In exemplary embodiments where two or more nonionic surfactants are present, the first nonionic surfactant can be present in an amount from 0.05% to 1.0%, and more particularly from 0.10% to 0.75% by weight of the cleaning, disinfecting and sanitizing composition. The second nonionic surfactant can be present in an amount from 0.05% to 1.0%, and more particularly from 0.10% to 0.75 by weight of the cleaning, disinfecting and sanitizing composition.

As stated above, the cleaning, disinfecting and sanitizing composition may optionally include and/or be used in combination with one or more additional components or adjuncts. The adjuncts include, but are not limited to, water, surfactants, emollients, fragrances and/or perfumes, botanical extracts, oils and/or lotions, silicones, waxes, dyes and/or colorants, solubilizing materials, stabilizers, thickeners, defoamers, hydrotropes, chelating agents, buffers, builders, enzymes, solvents, bleaching agents, cloud point modifiers, preservatives and/or combinations of the same. Any suitable solvent can be utilized with the cleaning composition of the disclosure, but in certain exemplary embodiments the solvent is selected from ethanol, isopropanol, water and combinations thereof.

In one exemplary embodiment of the present invention, the cleaning, disinfecting and sanitizing composition can be loaded onto an absorbent substrate. The absorbent substrate is preferably water-insoluble. By "water insoluble" is meant that the substrate does not dissolve but may readily break apart upon immersion in water. This cleaning, disinfecting and sanitizing composition can be used on flushable wipes in which the nonwoven substrate readily breaks apart after flushing. The water insoluble substrate is the implement or vehicle for delivering the cleaning, disinfecting and sanitizing composition of the present invention to the hard surface to be cleansed. As used herein, the terms "substrate" or "wipe" are intended to include any material on which a cleaning composition may be loaded. In functional applications, a substrate is used to clean an article or a surface, as by wiping. Substrates comprise woven or non-woven materials, typically made from a plurality of fibers. The substrate can be used by itself (typically by hand) or attached to a cleaning implement, such as a floor mop, handle, or a handheld cleaning tool, such as a toilet cleaning device. A wide variety of materials can be used as the substrate. Nonlimiting examples of suitable water insoluble substrates include nonwoven substrates, woven substrates, sponges, cloths, meshes, paper towels, napkins, cleaning pads, and the like.

Preferred embodiments employ nonwoven substrates since they are economical and readily available in a variety of materials. By nonwoven is meant that the layer is comprised of fibers which are not woven into a fabric but rather are formed into a membrane, sheet, substrate, mat, absorbent core or pad layer or combinations thereof. Nonwoven substrates may be comprised of a variety of materials both natural and synthetic. By natural is meant that the materials are derived from plants, animals, insects or byproducts of plants, animals, and insects. By synthetic is meant that the materials are obtained primarily from various man-made materials or from natural materials which have been further altered. The conventional base starting material is usually a fibrous web comprising any of the common synthetic or natural textile-length fibers, or mixtures thereof. Non-limiting examples of natural materials useful in the present invention are silk fibers, keratin fibers and cellulosic fibers. Non-limiting examples of keratin fibers include those selected from the group consisting of wool fibers, camel hair fibers, and the like. Non-limiting examples of cellulosic fibers include those selected from the group consisting of wood pulp fibers, cotton fibers, hemp fibers, jute fibers, flax fibers, and mixtures thereof. Non-limiting examples of synthetic materials useful in the present invention include those selected from the group consisting of acetate fibers, acrylic fibers, cellulose ester fibers, modacrylic fibers, polyamide fibers, polyester fibers, polyolefin fibers, polyvinyl alcohol fibers, rayon fibers, polyurethane foam, and mixtures thereof. Examples of some of these synthetic materials include acrylics such as acrilan, creslan, and the acrylonitrile-based fiber, orlon; cellulose ester fibers such as cellulose acetate, arnel, and acele; polyamides such as nylons; polyesters such as fortrel, kodel, and the polyethylene terephthalate fiber, dacron; polyolefins such as polypropylene, polyethylene; polyvinyl acetate fibers; polyurethane foams and mixtures thereof.

Without being bound to any theory, the cleaning, disinfecting and sanitizing composition of the present disclosure has shown antimicrobial activity at least as effective as prior art cleaning, disinfecting and sanitizing compositions that include anionic surfactants, depending on the level in the final formulation for the cleaning, disinfecting and sanitizing composition.

Example 1—The following are the components and amounts of the same that represent working example ranges of the components of the cleaning, disinfecting and sanitizing composition provided herein (all percentages by weight of the cleaning, disinfecting and sanitizing composition): 1) preservative (sodium benzoate) 0.10%-1.00%; 2) nonionic surfactant (alkyl polyglucoside): 0.10%-1.00%; 3) nonionic surfactant (ethoxylated fatty alcohol): 0.10%-1.00%; 4) defoamer/solubilizer (ethanol) 0.10%-1.00%; 5) active ingredient (citric acid): 0.10%-5.00%; 6) active ingredient (lactic acid): 0.10%-10.00%; 7) pH buffer (sodium citrate): 0.0%-0.40%; 8) fragrance 0.00%-1.00%; and 9) water: q.s. It is noted that the range of cleaning solution impregnated into the substrate includes from between 100% to 600% of the dry weight of the substrate.

Example 2—The following are the components and amounts of the same that represent a specific working example of the cleaning, disinfecting and sanitizing composition provided herein (all percentages by weight of the cleaning, disinfecting and sanitizing composition): 1) preservative (sodium benzoate—Kalaguard SB) 0.20%; 2) nonionic surfactant (alkyl polyglucoside—Glucopon 225): 0.30%; 3) nonionic surfactant (ethoxylated fatty alcohol—ECO Natrasense WS): 0.50%; 4) defoamer/solubilizer (ethanol—Ethanol 40 (B)) 0.50%; 5) active ingredient (citric acid—100%): 1.80%; 6) active ingredient (lactic acid—100%): 4.00%; 7) pH buffer (sodium citrate—sodium citrate dihydrate): 0.00%-0.40%; 8) fragrance (no rinse fragrance) 0.00%-1.00%; and 9) water: q.s. It is noted that the range of cleaning solution impregnated into the substrate includes from between 100% to 600% of the dry weight of the substrate.

A cleaning, disinfecting and sanitizing composition (CADW 6.0 w/lactic acid) formed according to the formula described previously was tested for antimicrobial/disinfecting effectiveness against *Staphylococcus* in comparison with a first test cleaning, disinfecting and sanitizing composition (CADW 6.0) formed similarly to the CADW 6.0. w/lactic acid, but omitting both the lactic acid and any anionic surfactants, and second test cleaning, disinfecting and sanitizing composition (CADW 6.0 w/anionic surfactants) also formed similarly to CADW 6.0 w/lactic acid but without the lactic acid but including anionic surfactants. The procedure for the test follows that defined for the standard Pre-saturated or Impregnated Towelettes for Hard Surface Disinfection Test, the results of which are shown below in Table 1 along with the formulations for each of the cleaning, disinfecting and sanitizing compositions that were tested.

TABLE 1

*Staphylococcus* Disinfection Efficacy Testing Results

| | CADW 6.0 | CADW 6.0 w/ Anionic | CADW 6.0 w/Lactic Acid |
|---|---|---|---|
| Disinfection Testing Results | 3 positive/10 slides fail | 0 positives/10 slides pass | 0 positives/10 slides pass |
| Water | q.s. | q.s. | q.s. |
| Sodium Benzoate | 0.20% | 0.20% | 0.20% |
| Alkylpolyglucoside | 0.30% | 0.30% | 0.30% |
| Alkylethoxylate | 0.50% | 0.50% | 0.50% |
| Ethanol | 0.50% | 0.50% | 0.50% |
| Citric Acid (100%) | 1.80% | 1.80% | 1.80% |
| Anionic surfactant #1 | — | 1.50% | — |
| Anionic surfactant #2 | — | 0.06% | — |
| Lactic Acid (100%) | — | — | 4.00% |

As can be seen from the results shown in Table 1, the substitution of the second organic acid, e.g., lactic acid, for the anionic surfactants known for use in conjunction with the first organic acid, i.e., citric acid, for disinfection purposes in food surface cleaning, disinfecting and sanitizing compositions is at least as effective for disinfection as the prior art citric acid and anionic surfactant compositions. Further, the second organic acid, e.g., the lactic acid, is a food safe ingredient, such that all of the components of the cleaning, disinfecting and sanitizing composition of the present disclosure are food safe ingredients, as designated by the EPA on its Inerts List, or with the NFS "D2" designation. As a result, the cleaning, disinfecting and sanitizing composition can be utilized on hard surfaces, such as food contact surfaces without the need or requirement for any post-application rinse, as required by prior art cleaning compositions. Further, the pH of the various formulations of the cleaning, disinfecting and sanitizing composition in one exemplary embodiment is at least above 2.0, and in another exemplary embodiment is at least above 3.0. Also, the formulations of the cleaning, disinfecting and sanitizing composition allows for no lower than and EPA Category III rating for safety and more particularly an EPA Category IV rating for safety.

Further, in addition to the use of the cleaning, disinfecting and sanitizing composition of the present disclosure on or with wipe wipes, the cleaning, disinfecting and sanitizing composition can be utilized as or with a spray, a liquid, a gel and any suitable concentrated and dilutable disinfectant products.

The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. A cleaning, disinfecting and sanitizing composition consisting of:

a preservative present in an amount of 0.10%-1.00% w/w;

a first nonionic surfactant present in an amount of 0.10%-1.00% w/w, the first nonionic surfactant consisting of an alkyl polyglucoside;

a second nonionic surfactant present in an amount of 0.10%-1.00% w/w, the second nonionic surfactant consisting of an ethoxylated fatty alcohol;

a defoamer/solubilizer present in an amount of 0.10%-1.00% w/w;

a first carboxylic acid present in an amount of 0.10%-5.00% w/w;

a second carboxylic acid present in an amount of 0.10%-10.00% w/w;

a pH buffer present in an amount of 0.0%-0.40% w/w;

a fragrance present in an amount of 0.00%-1.00% w/w; and water.

2. A cleaning, disinfecting and sanitizing composition according to claim 1, wherein the first carboxylic acid is citric acid.

3. A cleaning, disinfecting and sanitizing composition according to claim 1, wherein the second carboxylic acid is selected from the group consisting of: acetic acid, formic acid, oxalic acid, malic acid, tartaric acid, and lactic acid.

4. A cleaning, disinfecting and sanitizing composition according to claim 3, wherein the second carboxylic acid is lactic acid.

5. A cleaning, disinfecting and sanitizing composition according to claim 1, wherein the first nonionic surfactant is a $C_8$-$C_{10}$ alkyl polyglucoside.

6. A cleaning, disinfecting and sanitizing composition according to claim 1, wherein the cleaning composition does not require a post-application water rinse.

7. A cleaning, disinfecting and sanitizing wipe comprising a substrate and a cleaning, disinfecting and sanitizing composition according to claim 1 loaded onto the substrate.

8. A method of cleaning a food contact surface, the method comprising the steps of:

providing a cleaning, disinfecting and sanitizing composition according to claim 1; and applying the cleaning composition to the surface, wherein the cleaning, disinfecting and sanitizing composition does not require a post-application water rinse for the surface.

9. A method according to claim 8 wherein the step of providing the cleaning composition, disinfecting and sanitizing comprises the step of applying the cleaning composition, disinfecting and sanitizing to a substrate to form a cleaning, disinfecting and sanitizing wipe.

* * * * *